United States Patent
McIntyre et al.

[19]

[11] Patent Number: 5,805,781
[45] Date of Patent: Sep. 8, 1998

[54] PRINTER METHOD AND APPARATUS FOR COMBINING SUB-IMAGES TO ELIMINATE IMAGE ARTIFACTS

[75] Inventors: C. Kevin McIntyre; John F. Mauzey; Mark R. Heim, all of Boise, Id.

[73] Assignee: Hewlett-Packard Company, Palo Alto, Calif.

[21] Appl. No.: 813,096

[22] Filed: Mar. 7, 1997

Related U.S. Application Data

[63] Continuation of Ser. No. 350,861, Dec. 7, 1994, abandoned.

[51] Int. Cl.$^6$ .................................................... G06F 15/00
[52] U.S. Cl. ........................................... 395/117; 395/109
[58] Field of Search .................................... 395/101, 109, 395/112, 113, 114, 117, 118, 128, 946, 947; 358/524, 530, 532, 534, 540, 447, 454, 458, 459; 382/254, 255, 256, 266, 267, 268, 269, 274, 282, 284, 299

[56] References Cited

U.S. PATENT DOCUMENTS

| | | | |
|---|---|---|---|
| 5,041,993 | 8/1991 | Rawlings | 382/304 |
| 5,129,049 | 7/1992 | Cuzzo et al. | 395/113 |
| 5,132,701 | 7/1992 | Stephenson et al. | 347/176 |
| 5,216,754 | 6/1993 | Satli et al. | 395/113 |
| 5,218,670 | 6/1993 | Sodek, Jr. et al. | 395/113 |
| 5,329,616 | 7/1994 | Silverbrook | 395/508 |
| 5,392,419 | 2/1995 | Walton | 395/112 |
| 5,422,729 | 6/1995 | Yoshida | 358/400 |
| 5,448,395 | 9/1995 | Lopez et al. | 395/224 |
| 5,471,563 | 11/1995 | Dennis et al. | 395/114 |
| 5,487,137 | 1/1996 | Matsuhiva | 395/109 |

*Primary Examiner*—Joseph Mancuso
*Assistant Examiner*—Gabriel I. Garcia

[57] ABSTRACT

A printer produces an improved pixel image representation of encoded image data when sub-image portions are combined into larger image portions. The printer receives encoded image data as a data stream of sub-image segments and stores the sub-image segments. Each sub-image segment includes associated graphics state information which defines at least some image attributes of the sub-image segment. When each new sub-image segment is completely received, it is placed on a closed image list. Upon such listing, the printer's processor compares the graphics state information and boundary data for the now complete sub-image segment with at least one other listed sub-image segment in the closed list. The processor combines the new sub-image segment with the other sub-image segment if both a matching graphics state and matching boundary data are found. An image processor within the printer then subjects the combined sub-image segments to spatial processing as a unitary image.

17 Claims, 8 Drawing Sheets

WHAT THE PRINTER RECEIVED — IMAGE RECONSTRUCTION

SUB IMAGE 1

SUB IMAGE 2

SUB IMAGE 3

SUB IMAGE 4

SUB IMAGE 5

SUB IMAGE 6

PRINTER METHOD AND APPARATUS FOR COMBINING SUB-IMAGES TO ELIMINATE IMAGE ARTIFACTS

CROSS REFERENCE TO RELATED APPLICATION(S)

This is a continuation of application Ser. No. 08/350,861 filed on Dec. 7, 1994, now abandoned.

FIELD OF THE INVENTION

This invention relates to printers which represent an image in the form of a bi-level dot raster presentation and, more particularly, to a method and apparatus for improving a raster image presentation when an image is received by a printer in segments which are then recombined during image processing.

BACKGROUND OF THE INVENTION

Laser printers must process received image data at a speed that keeps up with the rate of paper movement and the scan speed of the laser beam. Due to the mechanics and tolerances of a laser printer, which enable high resolution and precise dot placement, it is not cost-feasible to stop and restart paper movement to allow the laser printer's processor to catch up if processing of a received image falls behind the laser print action. More specifically, data must always be available for the laser print engine, so as to prevent a page "overrun" which, in effect, causes the ejection of a partially printed page.

If a complete bitmap is produced and stored in the laser printer prior to starting the laser print engine, the partially printed page problem is avoided. Such a bitmap requires the provision of sufficient memory to store an entire page image and adds significantly to the cost of the laser printer. For instance, a 300 dot-per-inch resolution printer requires a memory size of approximately 1 megabyte to represent an 8.5 inch×11 inch page. A laser printer which produces images at a resolution of 600 dots-per-inch, requires a bitmap memory of four megabytes.

The prior art has reduced the amount of memory required for such image processing by dividing an incoming page image into a series of page strips. A subset of those page strips is then rasterized prior to starting the laser print engine. As a first page strip is printed, the memory it occupies is freed-up so that another page strip can be placed into the available memory space. This round-robin approach continues until the entire page image (and all image strips) are printed.

Other techniques are employed to further allow a reduction of required memory to handle received page images. One such technique employs data compression procedures. Such data compression procedures employ both lossy and lossless compression techniques. A lossless compression technique is one which produces a reduced size image data set which can be reconstructed into the original image data set without loss of data.

Lossy image compression, by contrast, involves an elimination of some image data which thereafter cannot be retrieved. Lossy compression algorithms often compress image data by examining neighborhoods of pixels (picture elements) during image data compression. During compression, a neighborhood of pixels (e.g. a 3×3 or 2×2 pixel group) is analyzed and the number of pixels is reduced to enable a lesser pixel number to represent the larger neighborhood. Upon decompression, there is no way to precisely reconstruct the original neighborhood of pixels which led to the compressed pixel representation. For instance, typical images which vary in grey scale (i.e. intensity) do not typically change from full intensity to no intensity between adjacent pixels. A lossy decompression algorithm uses that fact to determine what is happening with the image intensity over a neighborhood of pixels, in an attempt to reproduce lost pixels. There is, as a result, some image degradation which occurs during the decompression action.

Image discontinuities can arise when a printer reconstructs an image from sub-images that a host processor has transmitted. This is especially so if the various sub-images are subjected to neighborhood processing in the printer. A similar image discontinuity problem can arise when page strips are processed differently in the printer e.g. when a "low" memory condition occurs. When the page strips are subjected to neighborhood-style processing and are later recombined in the raster image buffer, the eventual printed image may display discontinuities between the sub-image portions. Such discontinuities result from the neighborhood processing procedure arriving at inconsistent pixel representations at sub-image or page strip boundaries. This problem is particularly obvious when a grey scale image is produced by the printer.

Accordingly, it is an object of this invention to provide a printer with an improved method and apparatus for preventing discontinuity artifacts from appearing in output printed images.

It is another object of this invention to provide a bi-level printer with a capability to output received sub-images as a complete image without the appearance of discontinuity artifacts.

SUMMARY OF THE INVENTION

A printer produces an improved pixel image representation of encoded image data when sub-image portions are combined into larger image portions. The printer receives encoded image data as a data stream of sub-image segments and stores the sub-image segments. Each sub-image segment includes associated graphics state information which defines at least some image attributes of the sub-image segment. When each new sub-image segment is completely received, it is placed on a closed image list. Upon such listing, the printer's processor compares the graphics state information and boundary data for the now complete sub-image segment with at least one other listed sub-image segment in the closed list. The processor combines the new sub-image segment with the other sub-image segment if both a matching graphics state and matching boundary data are found. An image processor within the printer then subjects the combined sub-image segments to spatial processing as a unitary image.

DETAILED DESCRIPTION OF THE INVENTION

Figure 1:
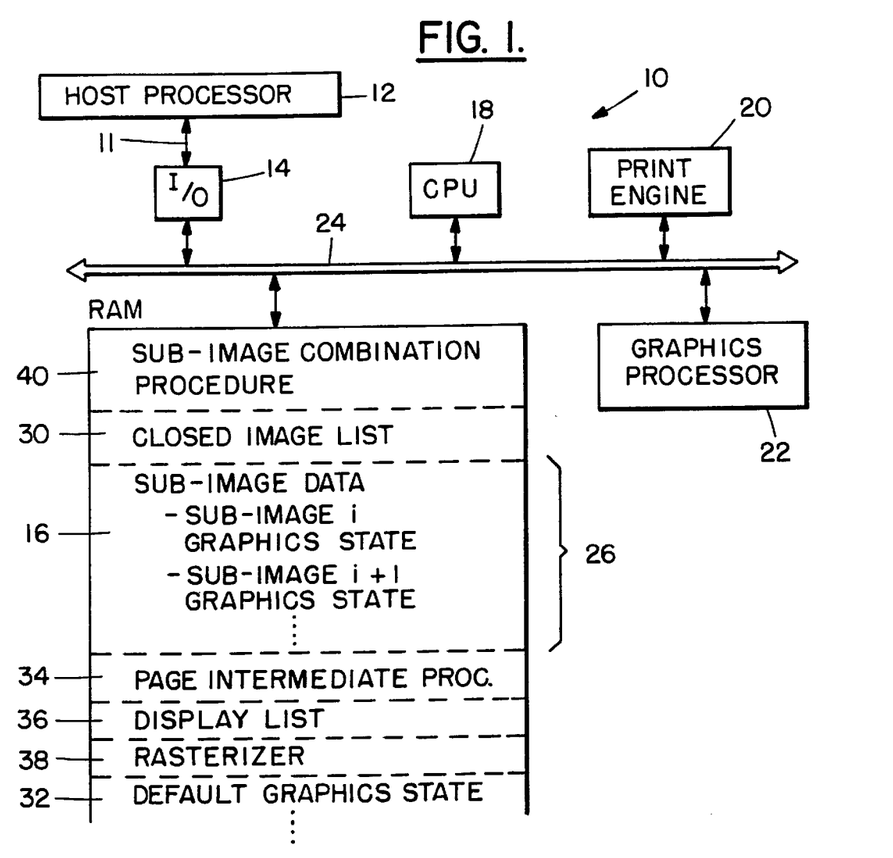
FIG. 1 is a high level block diagram of a laser printer incorporating the invention hereof.

Referring to FIG. 1, a printer 10 receives sub-image data via a data stream 11 from a host processor 12. Sub-image data is fed via an input/output (I/O) interface 14 to a random access memory (RAM) 16. Printer 10 includes a central processing unit (CPU) 18, a laser printer engine 20 and a graphics processor 22, all of which are connected via a bus system 24.

It is to be hereafter understood that the procedure of the invention can be carried out in either printer 10, a printer driver operating on host processor 12 or in some combination of printer 10 and host processor 12. For the purposes of the description below, it will be assumed that the entire procedure occurs within printer 10.

The sub-image data received from host processor 12 is placed into a RAM 16, in sub-image data area 26. When a sub-image is received, an identifier (ID) is assigned to it. The sub-image ID is stored in a closed image list 30, to enable further processing of the sub-image. The actual sub-image data is stored in area 26.

It will be understood by those skilled in the art that sub-image data received from a host processor may have other page marking commands interspersed. Further, sub-images, per se, are not necessarily received in serial fashion. Thus, printer 10 will generally be provided with a procedure that enables data from multiple sub-images to be accumulated concurrently until each full sub-image is fully received. Such procedures are known in the prior art and will not be described further.

Each sub-image includes a graphics state indicator which defines graphical attributes of the sub-image. Printer 10 may include a default graphics state data area 32 which is created when host processor 12 and printer 10 initialize their connection. Thereafter, each sub-image includes data that indicates whether its graphics state is identical to the default graphics state. If not, the received sub-image data includes information that identifies graphics state data which differs from the default graphics state.

Prior to describing graphics state data that defines a sub-image, the remaining entries in RAM 16 will be considered. When sub-image data is first received, a parser (not shown) analyzes incoming data stream 11 and generates "high level" graphics primitive descriptions of the sub-image which are stored in area 26 of RAM 16. In prior art laser printers, a graphics processor 22 would accept the high level graphics primitive descriptions of the sub-image data segments from the parser and generates "low level" graphics primitives (i.e., descriptions of sub-images). Those low level primitives are process commands and data that are stored in a page intermediate area 34 of RAM 16 and are listed as ready for printing in a display list 36. A rasterizer procedure 38 would then, under control of CPU 18 convert the page intermediate form data into full raster data for printing by print engine 20. No attempt is made in prior art printers to combine the sub-images into larger image segments.

In this invention, graphics processor 22, in combination with a sub-image combination procedure 40 (in RAM 16), performs an image combining procedure that occurs before processing of sub-images by graphics processor 22. It is to be noted that during the processing of sub-images by graphics processor 22, neighborhood operations may be performed. Such neighborhood operations generally do not occur with respect to sub-images until completion of sub-image combination procedure 40.

As indicated above, default graphics state data is passed between host processor 12 and printer 10 at initialization. If any sub-image is configured using a graphics state that is not identical to the default graphics state data, the sub-image carries with it data which indicates that fact. Graphics state data defines certain image attributes which are used to assure that received sub-images can be combined. Graphics state information comprises: the number of bits per pixel; the color palette to be employed for the image; any regional logical operator that is employed during neighborhood operations; background patterns and the location thereof; half toning techniques; gamma correction values which enable an input color image to be properly represented in halftone; and whether the image is rotated, scaled or translated. As will be hereafter understood, unless the graphics state information of a sub-image is identical with that of another sub-image, a combination of the respective sub-images is not performed.

Figure 2:
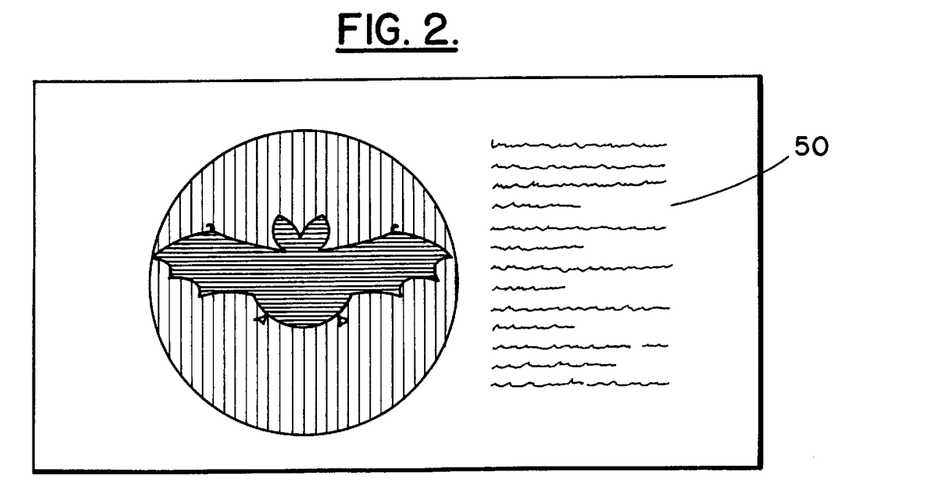
FIG. 2 illustrates an image that is input by a user to a host processor.
Figure 3:
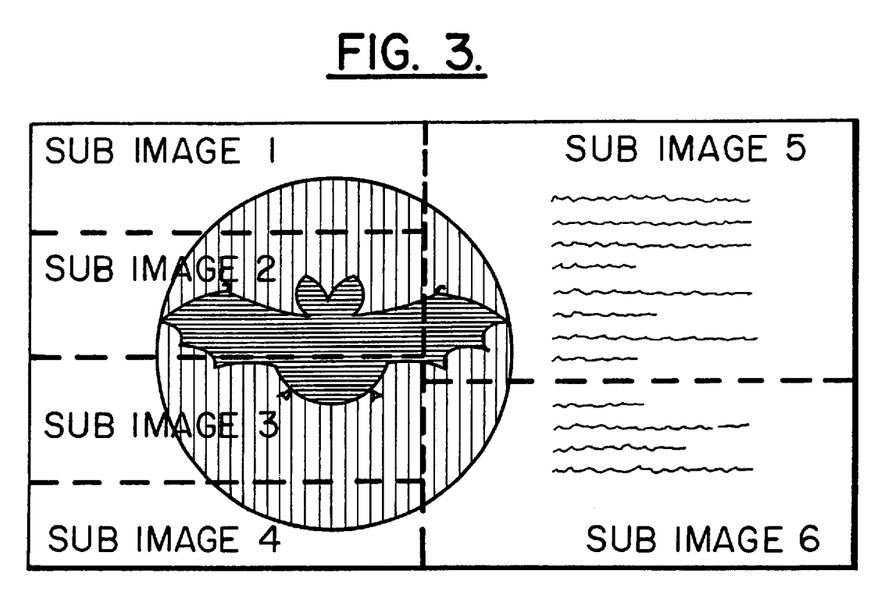
FIG. 3 indicates how a host processor decomposes the image of FIG. 2 into six sub-images.
Figure 4:
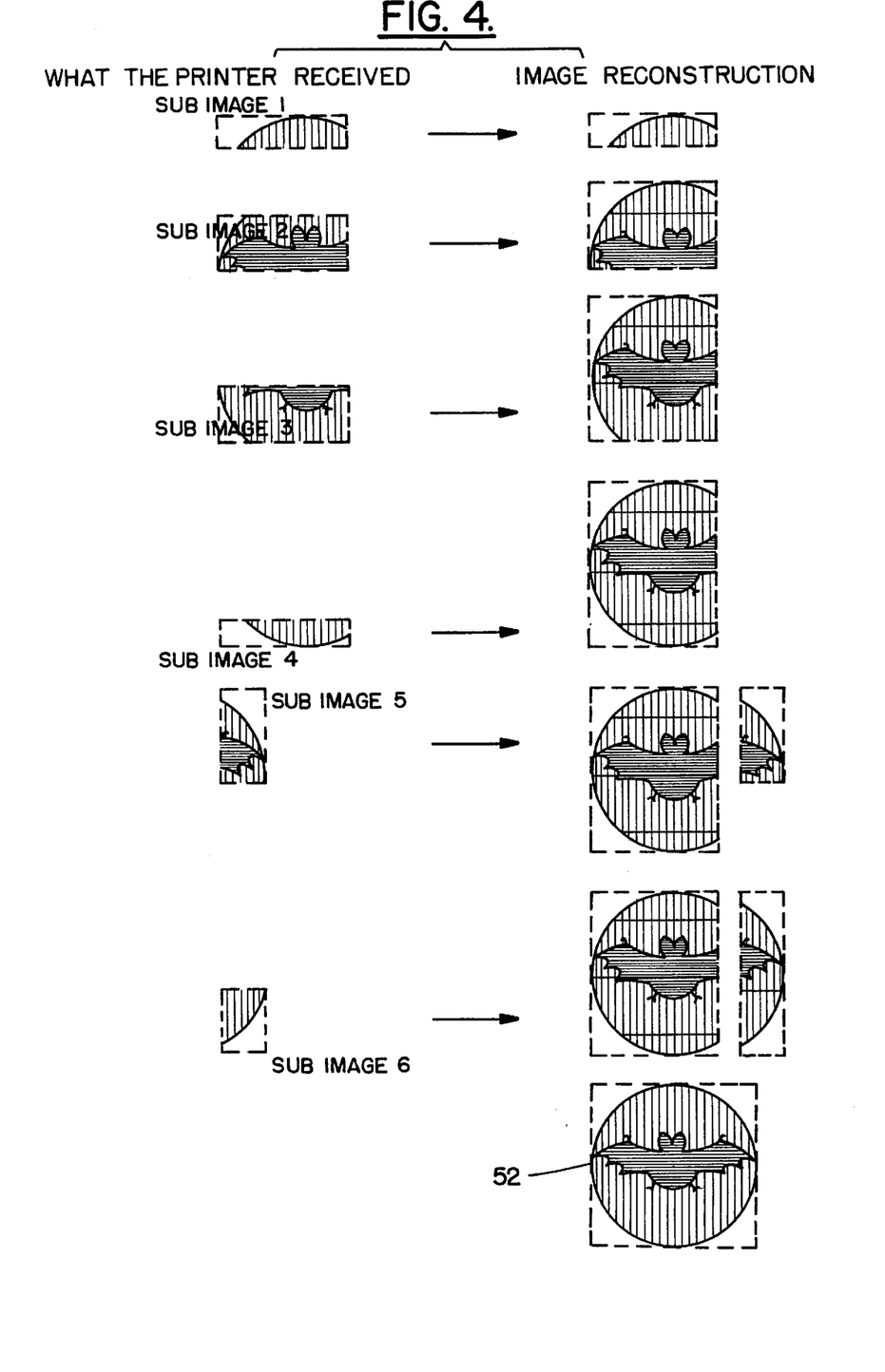
FIG. 4 illustrates how a printer receives the six sub-images of FIG. 3 and reassembles them into the original image.

Turning now to FIG. 2, an initial image 50 is created by a user at host processor 12. Image 50 comprises a black bat-image on a grey scale background, with text to the right of the grey scale area. During processing by an application on host processor 12, image 50 is broken into six sub-images (1–6) as shown in FIG. 3. Those sub-images are sequentially transmitted to printer 10 via I/O interface 14 and are received as shown in FIG. 4. Each sub-image is received as an independent image and includes no information identifying it as part of a larger image. As each sub-image is received, it is assigned an ID and is combined with subsequently received sub-images to form complete image 52 (shown at the bottom of FIG. 4). Image 52 is then operated upon by graphics processor 22. As a result, neighborhood operations are performed continuously across the combined images, avoiding boundary artifacts.

Image data received from host processor 12 exhibits a temporal order which must be maintained during printing. This assures that image data to be printed which overlaps other printed image data, is always imaged (and printed) after the overlapped image data. Such temporal queuing of image data is assured by proper placement of the image data into display list 36.

Figure 5:
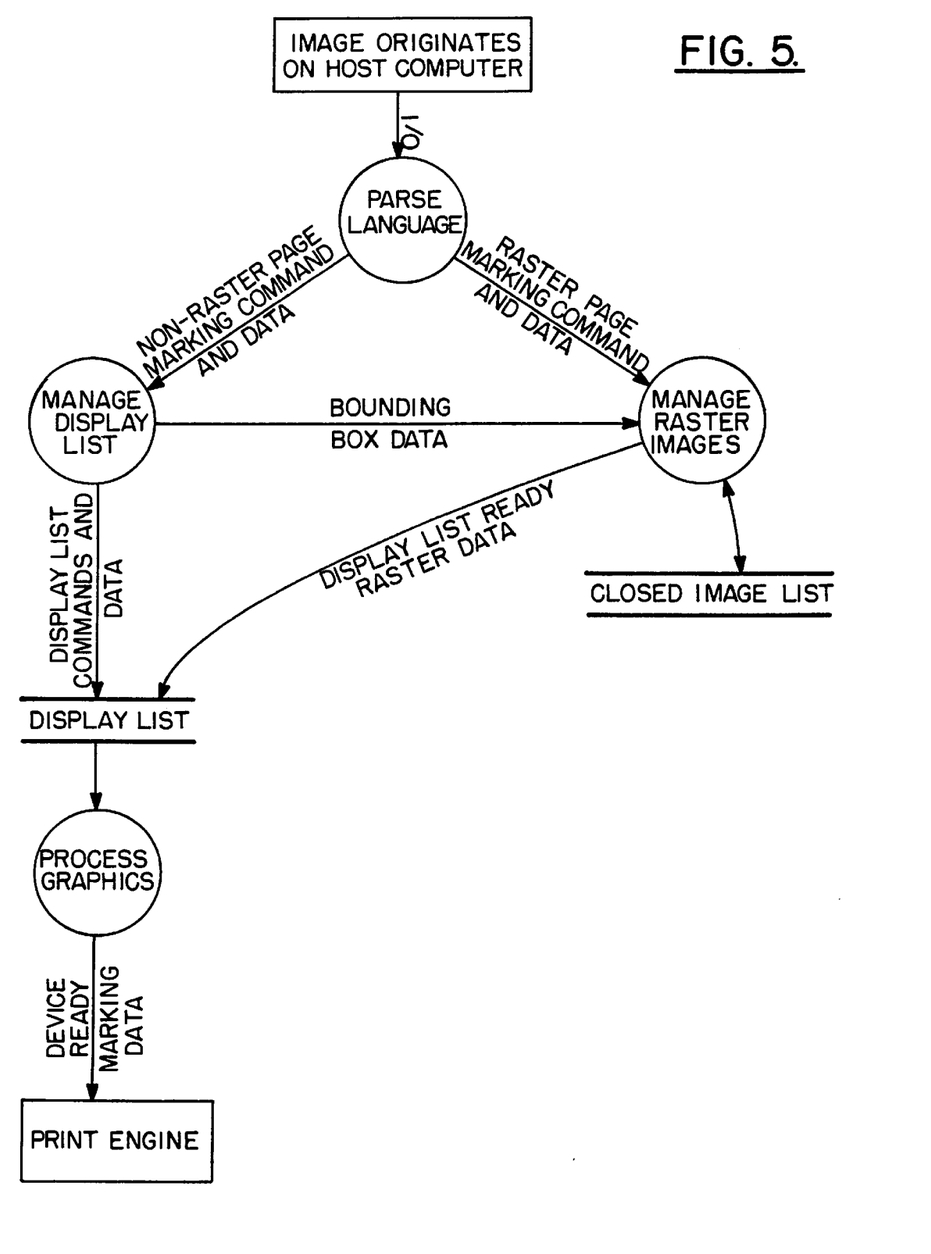
FIG. 5 is a diagram which illustrates the overall operation of the invention and is to be considered in conjunction with FIGS. 6–9.
Figure 6:
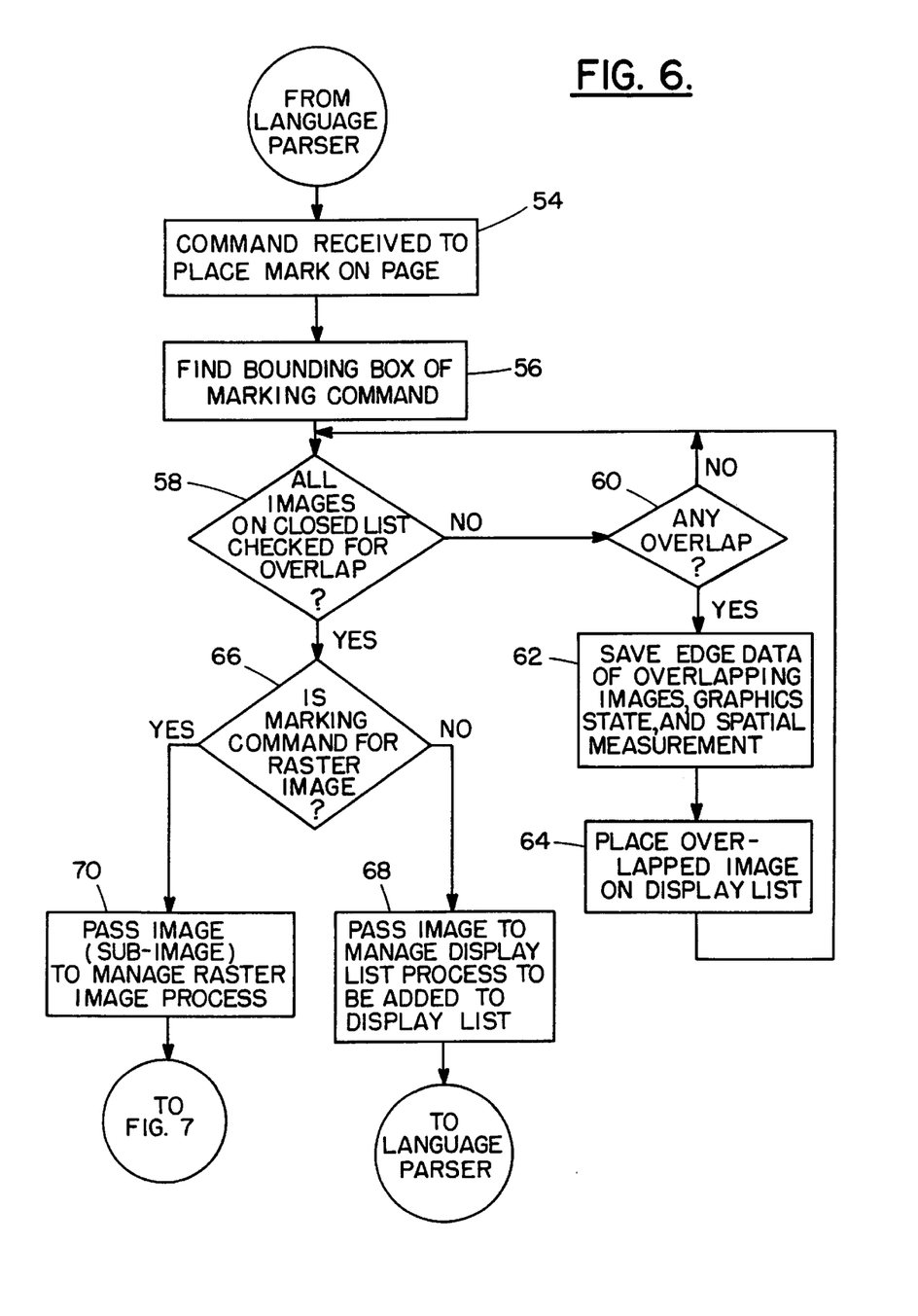
FIGS. 6, 7 and 8 illustrate a high level flow diagram of the procedure employed by the invention to enable assembly of the sub-images received by the printer of FIG. 1.

In FIGS. 5 and 6, the procedure followed by the printer of FIG. 1 to assure retention of image data temporal order is illustrated. FIG. 5 illustrates the overall data flow and data processing operations that are performed during the procedure of the invention. Initially, data received from host processor 12 is analyzed by a parser procedure in printer 10 to identify page marking commands and data (See box 54 in FIG. 6). A page marking command, as the name implies, requires the placement of an image on the page. Next a "bounding box" for the image, as defined by the received page marking command, is determined (box 56). A bounding box is the minimum size rectangle that encloses the image. For non-rectangular images (e.g. vectors), the bounding box generalizes to be a bounding polygon.

Each image bounding box is checked against other bounding boxes for raster images (containing pixel data) listed on closed image list 30 (decision boxes 58 and 60). If an overlap is found (box 62), the edge data of the overlapping images and their graphics states are saved and the image that is overlapped is placed on display list 36 to assure that it will be printed prior to the overlapping image boxes (box 64). The procedure then recycles back to decision box 58 until all image boxes have been checked for overlaps.

It is next determined whether the received image is either a raster sub-image or a non-raster image (decision box 66). If the received image is a non-raster image, it is passed to the display list manager which lists the image on display list 36 (box 68). Otherwise, the raster image (i.e. sub-image) is passed to a raster image manager (box 70) which determines if the raster image (sub-image) should be combined with previously received images (sub-images). Hereafter it is assumed that the received image is one of the sub-images shown in FIG. 4.

Figure 7:
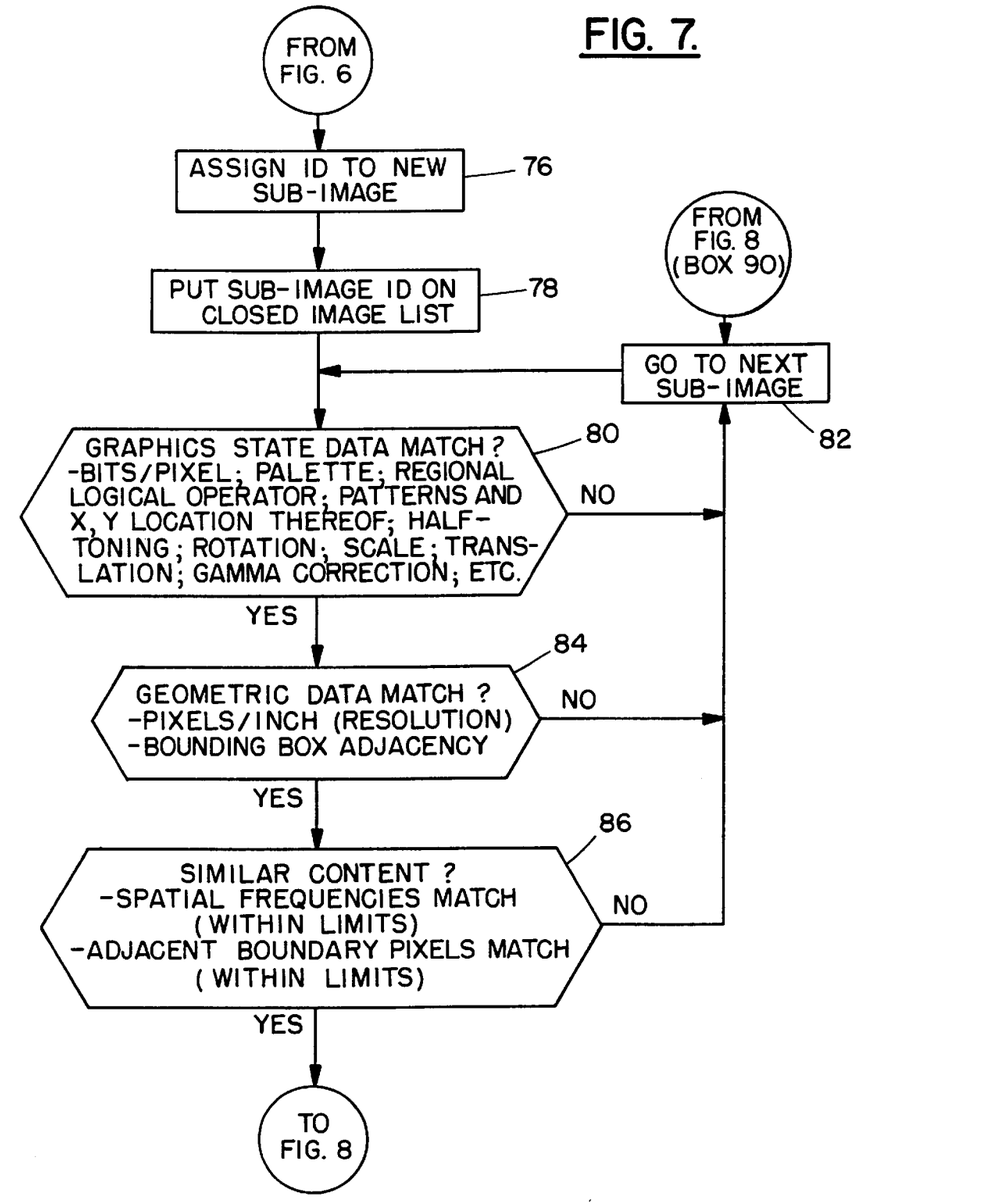

Referring now to FIG. 7, the raster sub-image data is initially assigned an ID value (box 76) and that ID value is listed on closed image list 30 (box 78), indicating that a full sub-image is now resident in sub-image data area 26 of RAM 16. At this stage, it is assumed that at least one other sub-image has been previously received and that its ID resides in closed image list 30. A decision is now made as to whether the sub-images listed on closed image list 30 should be combined into a larger sub-image (or a full image). That decision process comprises three data comparison operations, carried out under control of sub-image combination procedure 40 in conjunction with CPU 18. The three data comparison procedures to be described below are in a preferred order. However, it is to be understood that their order may be altered in accordance with a specific implementation requirement or other environment dictates.

Initially the procedure determines whether there is a match of graphics state information for the sub-images being compared and if yes, then proceeds to determine whether there is a "geometric" match of the sub-images (e.g. are the images adjacent?). If a geometric match is found, then it is determined whether the sub-images include similar "content" (to be described below) and if a yes is again found, then sub-image combination procedure 40 combines the sub-images to create a single larger image. The IDs of the combined sub-images are replaced by a new ID on the closed image list and the data comprising the sub-images being combined in RAM area 26 are linked so that they will be processed as a single image.

Sub-image combination procedure 40 moves through three levels of data comparison. Initially, it determines if the graphics state data for the two listed sub-image IDs are identical (box 80). If no, the procedure moves to a next sub-image (box 82) and the routine repeats. If yes, it next determines if there is a match of geometric data for the two sub-images (decision box 84).

The geometric data comparison determines whether the sub-images exhibit identical resolutions (pixels/inch); and whether their "bounding boxes" exhibit an adjacency. As used herein, a "bounding box" is defined by coordinates of a minimum sized rectangle which encompasses all pixels of a raster sub-image. The edges of a bounding box are defined by pixels along the edges of the raster sub-image. Knowing the bounding box, the procedure determines whether at least one edge of a bounding box for a first sub-image is immediately adjacent an edge of a bounding box of a second sub-image (i.e. an "adjacency criteria"). If no, the procedure exits and proceeds to obtain a next sub-image (box 82) and moves on to the next sub-image comparison procedure.

If the geometric data match finds that the both resolution and adjacency criteria are met, a next determination is made as to whether the sub-images contain "similar" content (box 86). It is to be initially understood that the procedure may exit at the end of the geometric data matching operation (decision box 84) and proceed directly to a combination of the sub-images. However, the content comparison (decision box 86) enables determination of a further level of assurance that the images should be combined.

Content similarity arrives at a determination as to whether the sub-image data contents are sufficiently similar to evidence a similar grey scale or other image feature at their joint boundary. Such content similarity may be found by determining a spatial frequency of adjacent sub-images or by determining if the percentage of pixels on either side of the adjacent bounding box boundaries are the same (e.g. 50% or greater identical pixels).

Spatial frequency of a pixel sub-image is found by determining the frequency of pixel values on either side of a common boundary between bounding boxes. This enables a determination to be made as to whether the spatial frequency of pixel values on one side of the boundary is the same or similar to the spatial frequency of pixels on the other side of the boundary. In this instance, the comparison of spatial frequencies should match within preestablished threshold limits (e.g., the spatial frequencies should be +/−20% of each other).

A more simple content similarity test can be performed which only employs immediately adjacent pixels of a pair of adjacent bounding boxes. In such a test, as indicated above, it is determined whether a given percentage (e.g. 50%) or more of the pixels are identical along bounding box boundaries between a pair of sub-images.

If, with either content similarity test, the prescribed threshold values are equalled or exceeded, then it is determined that the sub-images should be combined (decision box 86). Otherwise, the procedure again recycles and a next sub-image is obtained (box 82).

Figure 8:
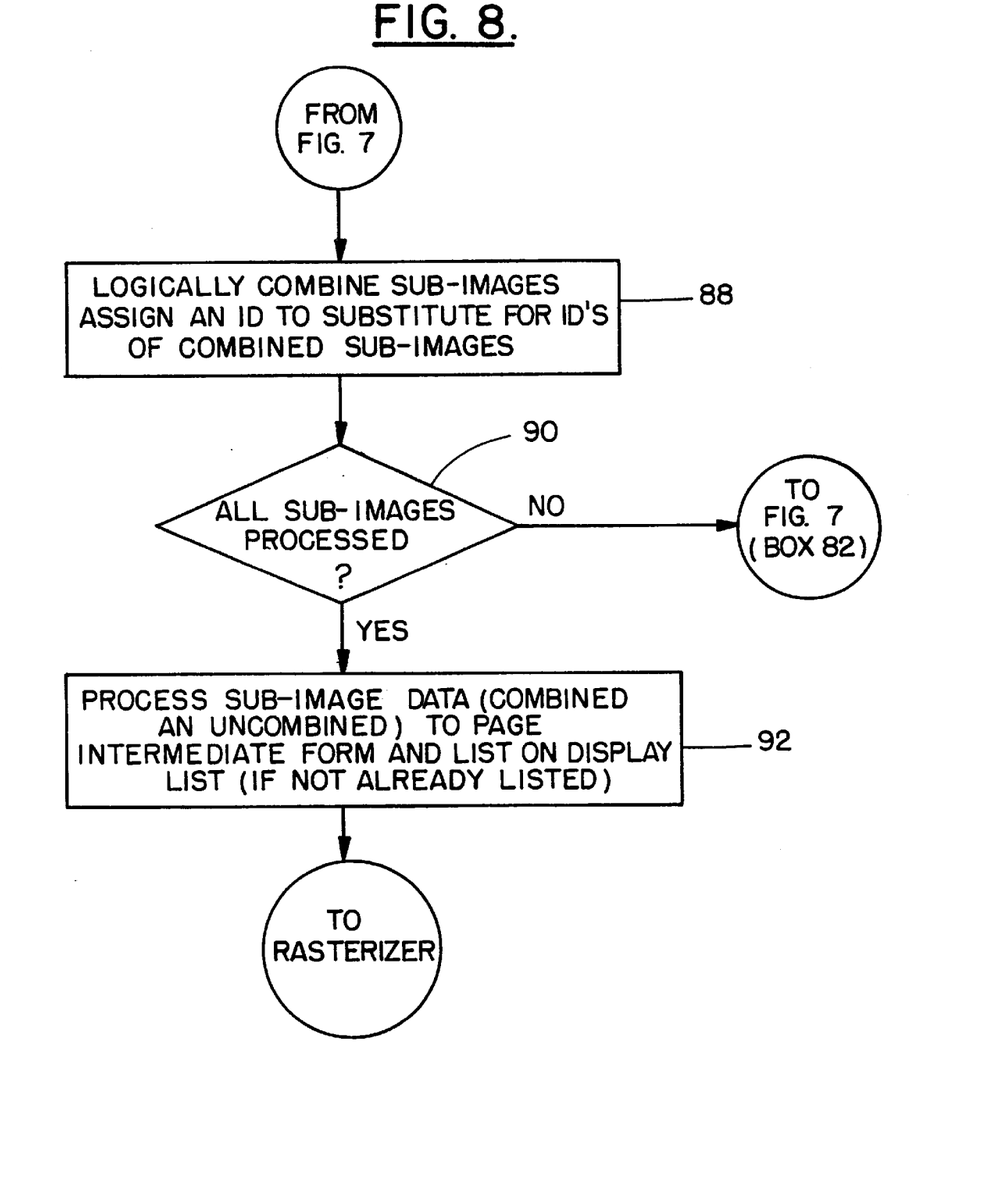

As shown in FIG. 8 and assuming that it is determined that bounding sub-images should be combined, the procedure logically combines the images by assigning a new ID to the combined sub-images and substitutes the new ID for the two superseded IDs on the closed-image list. The sub-image data, per se, is also linked to the new ID so that it will be handled during further processing as a single sub-image (box 88).

Next, it is determined whether all sub-images on a page have been processed (decision box 90) and if not, the procedure recycles to obtain a next sub-image. At this stage, the new ID combined image is then re-subjected to the processes shown in decision boxes 80, 84 and 86, with respect to all other listed ID sub-images. If all sub-images have been processed, the combined sub-image data (and uncombined sub-image data) is passed to graphics processor 22 for processing to provide the necessary page intermediate representation of the combined image data (box 92).

Because overlaps of image data have already been determined, certain overlapping image data has already been entered into display list 36 to preserve its temporal order. Since other sub-image data is processed as it is placed on closed image list 30, it may lose its temporal order when entered onto display list 36, as compared to other sub-images. This is of no concern so long as no overlap of sub-images is present.

Figure 9:
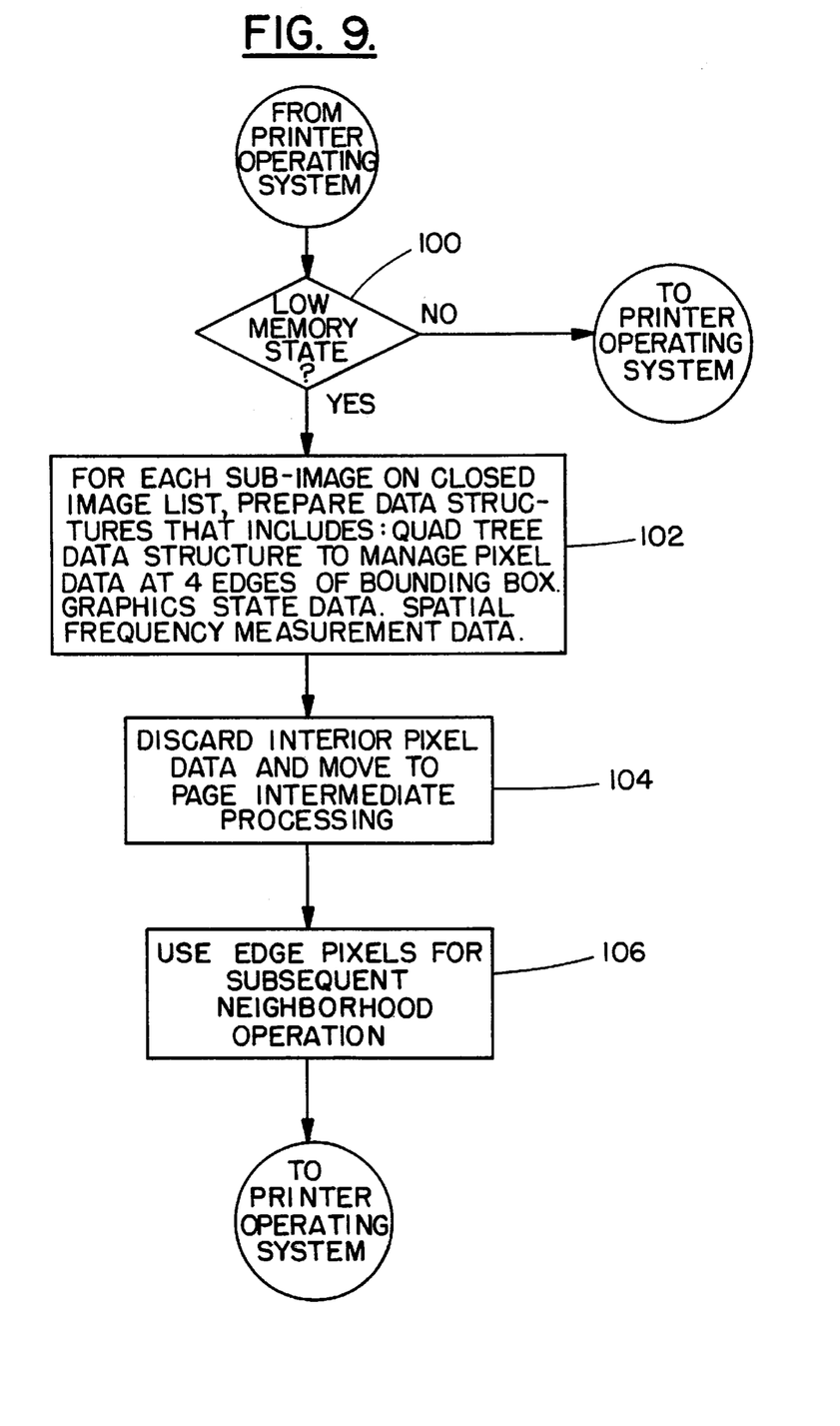
FIG. 9 illustrates the procedure of the invention when a low memory state is present in the printer of FIG. 1.

Turning now to FIG. 9, a further procedure will be described that is followed when a "low memory" state occurs in printer 10. A low memory state occurs when image data has been received which includes image details that requires substantial pixel data. Under such conditions, available RAM in printer 10 may be determined to be in a "low"

state. Under such a condition, efforts are taken by printer 10 to release areas of RAM 16 that are not required for further processing of sub-images.

As shown in FIG. 9, upon receiving an indication of a low memory state (box 100), each sub-image listed on the closed image list 30 is processed to prepare a "quad-tree" data structure that contains only the pixel edges of the sub-image (those pixel edges define the limits of the bounding box for the sub-image) (box 102). The quad-tree data structure also retains the graphics state information regarding the sub-image. At this point, the closed sub-image data is moved to page intermediate processing where data reduction occurs and memory previously allocated is released from allocation (box 104).

The procedure illustrated in FIGS. 7 and 8 for determining if sub-images should or should not be combined is then carried out. Of data evidencing the spatial frequency of pixel data has not been retained, the content similarly test shown in box 86 is limited to a determination of the identity of adjacent pixels on either side of the image boundary—as only those pixels are retained in the quad-tree data structure. Thus, only sub-image outline data is employed to enable a determination as to which sub-images should or should not be combined. If data evidencing the spatial frequency of the discarded pixel data is retained, the full content similarity test can be performed. During subsequent page intermediate processing, pixel edge information, contained in the quad-tree data structures, is employed if neighborhood operations are performed on the combined images so as to prevent image discontinuities.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for producing an improved pixel image representation of encoded image data, said apparatus comprising:

means for receiving and storing a data stream of sub-image segments, each sub-image segment including associated graphics state information defining at least some image attributes of said sub-image segment, said graphics state information including at least one of: a number of bits per pixel, a color palette to be employed, a regional logical operator that is employed during neighborhood operations, a background pattern and location thereof, a half-toning technique, a gamma correction value which enables an input color image to be properly represented in half tone and an indicator of whether the sub-image segment is rotated, scaled or translated;

processor means for comparing graphics state information and boundary data for a complete new sub-image segment with at least graphics state information and boundary data for another sub-image segment, and for combining said new sub-image segment with said another sub-image segment if both sub-image segments have matching graphics state information and at least partial matching boundary data; and image processing means for subjecting combined and uncombined image segments to spatial processing, said combined sub-image segments being processed as an integral image.

2. Apparatus as recited in claim 1, wherein said processor means does not proceed to determine if boundary data matches between said new sub-image segment and said another sub-image segment, if said graphics state information is not identical as between said sub-image segments.

3. Apparatus as recited in claim 1, wherein said processor means determines if said boundary data matches by determining bounding boxes for said new sub-image segment and said another sub-image segment, and further determines if a pixel edge for a bounding box of said new sub-image segment is adjacent a pixel edge of a bounding box of said another sub-image segment and, if yes, determines that a boundary data adjacency criteria has been met.

4. Apparatus as recited in claim 3, wherein said processor means only combines sub-image segments if pixel data in said new sub-image segment and in said another sub-image segment both have identical pixel resolution measures.

5. Apparatus as recited in claim 4, wherein said processor means further determines if said first sub-image segment and said another sub-image segment contain similar pixel content.

6. Apparatus as recited in claim 1, wherein said processor means performs a similar content determination by analysis of spatial frequencies of pixels in said new sub-image segment and said another sub-image segment, and if determined said spatial frequencies are within a threshold value range of each other, a similar content determination is signalled.

7. Apparatus as recited in claim 1 wherein said processor means performs said similar content determination by determining if pixel states at adjacent boundaries of bounding boxes are of a same kind, and if a determined percentage thereof are found to exhibit said same kind, a similar content determination is signalled.

8. Apparatus as recited in claim 1 wherein said image processing means lists processed sub-images in a display list to indicate a readiness of said processed sub-images for rasterization, said processor means further determining if received page-marking data for a page containing a processed sub-image overlaps said processed sub-image data and, if yes, causes said image processing means to list overlapping page-marking data subsequent to a listing of sub-image data that is overlapped by said page-marking data.

9. Apparatus as recited in claim 1, wherein said processor means, upon determining a low memory state in said apparatus, employs only pixel data at edges of a bounding box of said new sub-image segment and graphics state information with respect thereto, and relinquishes memory allocated to storage of pixel data interior to pixels defining edges of said bounding box of said new sub-image.

10. A method for producing an improved pixel image representation of encoded image data, wherein apparatus receives and stores a data stream of sub-image segments, each sub-image segment including associated graphics state information defining at least some image attributes of said sub-image segment, said method comprising the steps of:

comparing at least graphics state information and boundary data for a complete new sub-image segment with at least graphics state information and boundary data for another listed sub-image segment, said graphics state information including at least one of: a number of bits per pixel, a color palette to be employed, a regional logical operator that is employed during neighborhood operations, a background pattern and location thereof, a half-toning technique, a gamma correction value which enables an input color image to be properly represented in half tone and an indicator of whether the sub-image segment is rotated, scaled or translated;

combining said new sub-image segment with said another sub-image segment if both sub-image segments are determined to have a matching graphics state and at least partial matching boundary data; and subjecting combined and uncombined image segments to spatial processing, said combined sub-image segments processed as an integral image.

11. The method as recited in claim 10, wherein said comparing step determines that said boundary data matches by determining bounding boxes for said new sub-image segment and said another sub-image segment, and that a pixel edge for the bounding box of said new sub-image segment is adjacent a pixel edge of the bounding box of said another sub-image segment.

12. The method as recited in claim 11, wherein said combining step does not proceed unless said comparing step further determines that pixel data in said new sub-image segment and in said another sub-image segment both have identical pixel resolution measures.

13. The method as recited in claim 12, wherein said combining step does not proceed unless said comparing step further determines that said first sub-image segment and said another sub-image segment contain similar pixel content.

14. The method as recited claim 13, wherein said comparing step determines said similar pixel content by analysis of spatial frequencies of pixels in said new sub-image segment and said another sub-image segment, and if said spatial frequencies are within threshold boundaries of each other, said sub-image segments are determined to have similar content.

15. The method as recited in claim 13 wherein said comparing step determines said similar pixel content by determining if a determined percentage of pixel states at adjacent boundaries of bounding boxes exhibit a same kind and if yes, signals a similar content determination.

16. The method as recited in claim 10 further comprising the steps of:

determining if received page-marking data for a page containing a sub-image overlaps said sub-image and, if yes, causing said image processing means to list in a display list overlapping page-marking data subsequent to a listing of sub-image data that is overlapped by said page-marking data.

17. The method as recited in claim 10, further comprising the steps of:

determining a low memory state in said apparatus;

employing only pixel data at edges of a bounding box of said new sub-image segment and graphics state information with respect thereto; and relinquishing memory allocated to storage of pixel data interior to pixels defining edges of said bounding box of said new sub-image.

* * * * *